United States Patent [19]

Kobayashi et al.

[11] Patent Number: 4,748,868
[45] Date of Patent: Jun. 7, 1988

[54] APPARATUS FOR ABSORBING TORQUE FLUCTUATIONS

[75] Inventors: Kiyonori Kobayashi, Chiryu; Masakazu Kamiya, Toyoake; Junji Kagiyama, Toyota, all of Japan

[73] Assignee: Aisin Seiki Kabushiki Kaisha, Kariya, Japan

[21] Appl. No.: 895,936

[22] Filed: Aug. 13, 1986

[30] Foreign Application Priority Data

Aug. 20, 1985 [JP] Japan ................ 60-126585[U]

[51] Int. Cl.⁴ .................. F16F 15/10; F16D 3/14; F16D 47/02; F16D 3/66

[52] U.S. Cl. ...................... 74/574; 192/106.2; 192/105 BA; 464/68

[58] Field of Search ............... 192/106.1, 106.2, 70.17, 192/48.5, 104 C, 104 B, 105 BA; 464/62-68, 85, 83; 74/572, 574

[56] References Cited

U.S. PATENT DOCUMENTS

| | | | |
|---|---|---|---|
| 3,296,887 | 1/1967 | Larsen | 464/66 |
| 4,046,240 | 3/1977 | Schlagmuller et al. | 192/104 C |
| 4,274,524 | 6/1981 | Nakane | 74/574 |
| 4,557,702 | 12/1985 | Takeuchi | 464/68 |
| 4,560,054 | 12/1985 | Kayanoki et al. | 464/68 |
| 4,562,912 | 1/1986 | Kabayama | 192/106.2 |
| 4,585,427 | 4/1986 | Lamarche | 464/67 |
| 4,601,676 | 7/1986 | Tojima et al. | 464/68 |
| 4,624,351 | 11/1986 | Lutz et al. | 192/48.5 |
| 4,638,684 | 1/1987 | Maucher | 74/574 |

FOREIGN PATENT DOCUMENTS

| | | | |
|---|---|---|---|
| 3624610 | 3/1987 | Fed. Rep. of Germany | 74/574 |
| 2548299 | 1/1985 | France | 192/106.2 |
| 0119844 | 6/1986 | Japan | 74/572 |

Primary Examiner—Gary L. Smith
Assistant Examiner—Vinh Luong
Attorney, Agent, or Firm—Burns, Doane, Swecker & Mathis

[57] ABSTRACT

The apparatus relates to a device for absorbing torque and includes a first flywheel connected to the output shaft of an engine. A second flywheel, concentric with the first flywheel, is supported by a bearing on the first flywheel. A spring mechanism, a hysteretic mechanism and a slip mechanism are provided between the first and second flywheels. A centrifugal clutch is provided between the first and second flywheels for engaging the first flywheel with the second flywheel when the rotating speed of the engine has increased to a predetermined level.

1 Claim, 5 Drawing Sheets

Fig. 1
Fig. 2
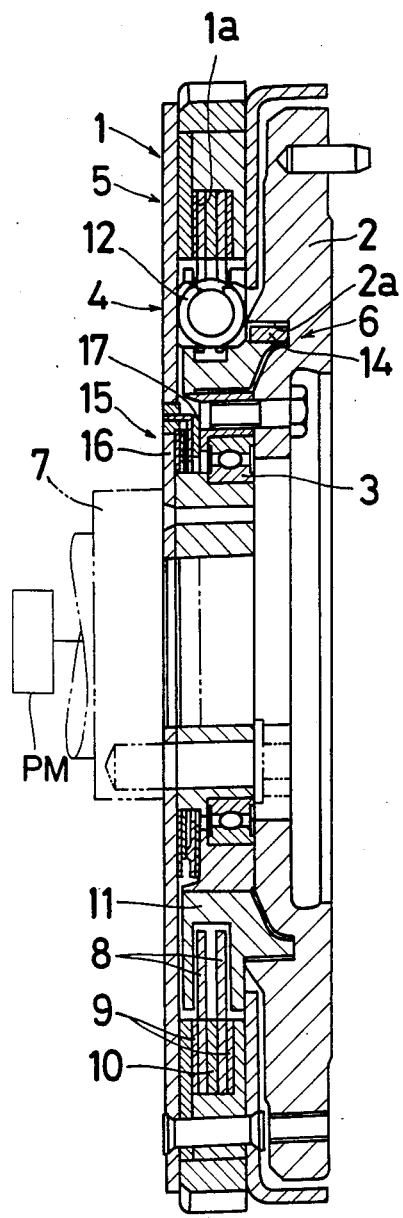
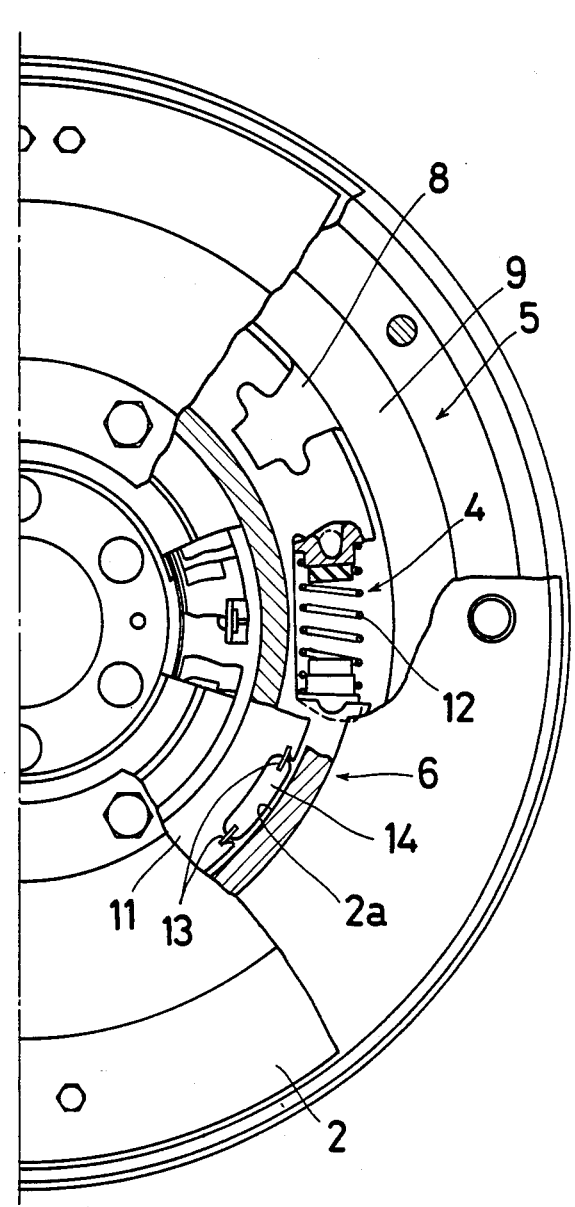

APPARATUS FOR ABSORBING TORQUE FLUCTUATIONS

BACKGROUND OF THE INVENTION

1. Field of the Invention

This invention relates to a device for absorbing torque fluctuations. The invention is particularly useful in a motor vehicle or vessel equipped with an engine which during operation, has wide torque fluctuations at its output, such as a diesel engine.

2. Description of the Prior Art

A typical device of the type to which this invention pertains is disclosed in Japanese Patent Publication No. 1497/1985. This patent publication discloses a first flywheel attached to the output shaft of an engine and a second flywheel which is concentric with the first flywheel. A bearing, spring mechanism and a slip mechanism are provided between the first and second flywheels. The first and second flywheels have a specific relation to each other with regard to the moment of inertia and cooperate with the spring mechanism to absorb vibration when the engine is rotating at a high speed. When the engine is rotating at a low speed, the slip mechanism absorbs excessive torque which is due to sympathetic vibration.

The slip mechanism of the prior art, however, is designed for actuation at a considerably high level of torque corresponding to a practically useful range of high rotating speeds which are at least equal to the idling speed of the engine. In order to absorb vibration effectively when the engine is rotating at a low speed, however, it is important to lower as far as possible the torque which is transmitted to the second flywheel. It is, therefore, necessary to lower the torque which the slip mechanism is designed for absorbing, or narrow the range of rotating speeds giving rise to a high level of torque, in order to diminish or absorb vibration effectively.

SUMMARY OF THE INVENTION

It is an object of the present invention to provide an improved device which can overcome the drawbacks of the prior art as hereinabove pointed out.

This object and others are attained by a device including, among other features, a centrifugal clutch provided between a first flywheel and a second flywheel for connecting the flywheels when the rotation speed of an engine has risen to a specific level.

When the engine is rotating at a low speed, the clutch remains disengaged and the vibration and noise which are produced by the rotation of the engine are, therefore, not transmitted from the first flywheel to the second flywheel. If the clutch is engaged when the engine is still rotating at a comparatively low speed, a slip mechanism absorbs any amount of torque exceeding the level for which the slip mechanism is set. If the engine comes to rotate at a higher speed which is at least equal to its idling speed, the first and second flywheels and a spring mechanism absorb any vibration and noise generated at the idling speed and above.

Other features and advantages of this invention will become apparent from the following description and the accompanying drawings.

BRIEF DESCRIPTION OF THE DRAWINGS

FIG. 1 is a cross sectional view of a device embodying the present invention;

FIG. 2 is a fragmentary front elevational view, partly in section, of the device shown in FIG. 1;

DETAILED DESCRIPTION OF THE PREFERRED EMBODIMENTS

Figure 3:
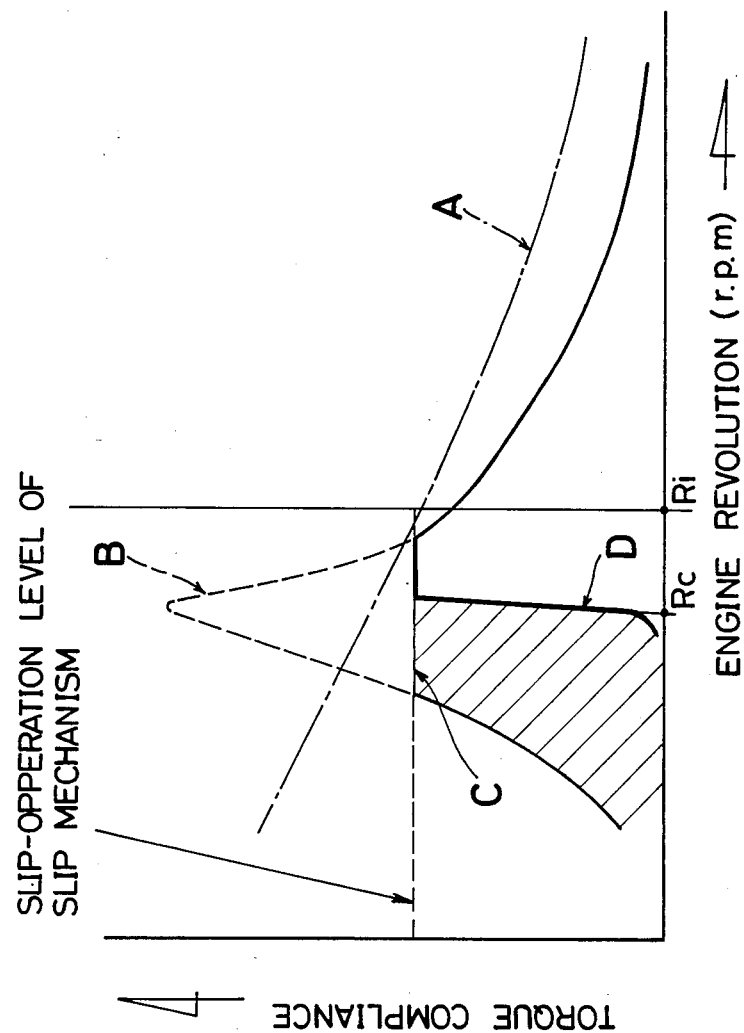
FIG. 3 is a graph comparing the performance of the device of this invention with that of others devices.

Referring first to FIGS. 1 and 2, a clutch assembly embodiying this invention includes a first flywheel 1 which is rotatably connected to an output shaft 7 of an engine (not shown) and a second flywheel 2 which is concentric with the first flywheel 1 and which is rotatably connected thereto by a bearing 3. A spring mechanism 4, a slip mechanism 5 and a centrifugal clutch 6 are provided between the first and second flywheels 1 and 2 within said clutch assembly.

The first flywheel 1 has an annular groove 1a. The slip mechanism 5 comprises two drive disks 8, two friction plates 9 and a cone spring 10 which are all fitted in the annular groove 1a. The friction plates 9 are designed for slipping upon receiving a predetermined amount of torque. An intermediate ring 11 which is concentric with the second flywheel 2 is rotatably disposed along the inner peripheries of the drive disks 8.

Each of the drive disks 8 has a recess in its inner periphery and the intermediate ring 11 has a recess in its outer periphery. The spring mechanism 4 comprises a coiled spring 12 having one end fitted in the recesses of the drive disks 8. The other end of the spring 12 is fitted in the recess of the intermediate ring 11 to transmit torque from the drive disks 8 to the intermediate ring 11.

The intermediate ring 11 is also provided with a plurality of other recesses spaced apart from one another along its outer periphery. The centrifugal clutch 6 comprises a plurality of centrifugal weights 14 each held by a pair of leaf springs 13 in one of the recesses of the intermediate ring 11. Each of the weights 14 has an outer peripheral surface facing the inner peripheral surface 2a of the second flywheel 2 in spaced apart relation therefrom.

A hysteretic mechanism 15 is provided within the inner peripheries of the first and second flywheels 1 and 2. The hysteretic mechanism 15 comprises a thrust spring 16 and a thrust lining 17 and produces hysteresis between the flywheels 1 and 2.

When the engine is rotating at a very low speed before reaching idling speed, the centrifugal clutch 6 remains disengaged, since the centrifugal weights 14 remain radially inwardly spaced from the second flywheel 2. Therefore, only a slight amount of torque is transmitted from the first flywheel 1 to the second flywheel 2 through the hysteretic mechanism 15. As the rotating speed of the engine increases, the centrifugal clutch 6 is engaged as the centrifugal weights 14 are radially outwardly moved into contact with the second flywheel 2. Therefore, torque is transmitted from the first flywheel 1 to the second flywheel 2 through the slip mechanism 5, spring mechanism 4 and centrifugal clutch 6. The clutch assembly compensates for torque induced fluctuations and absorbs such torque fluctuations or variations. Due to the fluctuations, shocks or vibrations are produced between the first and second flywheels 1 and 2 is damped by the slip mechanism 5. If the rotating speed of the engine further increases to a level exceeding its idling speed, the spring mechanism 4 functions to substantially suppress vibration.

FIG. 3 is a graph comparing the torque compliance characteristics of the clutch assembly according to the present invention with those of other devices. In FIG. 3, Curve A shows the torque compliance characteristics of a single conventional flywheel. Curve B shows the characteristics of a device comprising a first flywheel, a second flywheel and a spring mechanism. Curves A and B teach that if the torque compliance is lowered at a rotating speed above an idling speed $R_i$, sympathetic vibration occurs at a rotating speed below the idling speed $R_i$. Curve C shows the characteristics of the device disclosed in Japanese Patent Publication No. 1497/1985 which has hereinbefore been described as comprising a first flywheel, a second flywheel, a spring mechanism and a slip mechanism. This device can more effectively absorb the shacks or vibrations produced by torque fluctuations than a device not having any slip mechanism, as is apparent from a comparison of Curves B and C.

Curve D shows the characteristics of the device according to the present invention which further includes a centrifugal clutch, as hereinabove described. The clutch remains disengaged and the torque compliance remains low until the rotating speed of the engine reaches a certain level $R_c$ which is a predetermined amount lower than the idling speed $R_i$. If the rotating speed of the engine exceeds $R_c$, the clutch is engaged and the device shows the same characteristics as those shown by Curve C. Thus, the device of the present invention can damp the vibration in a low speed range (as shown by the area having oblique lines in FIG. 3) which the device disclosed in Japanese Patent Publication No. 1497/1985 cannot absorb.

Figure 4:
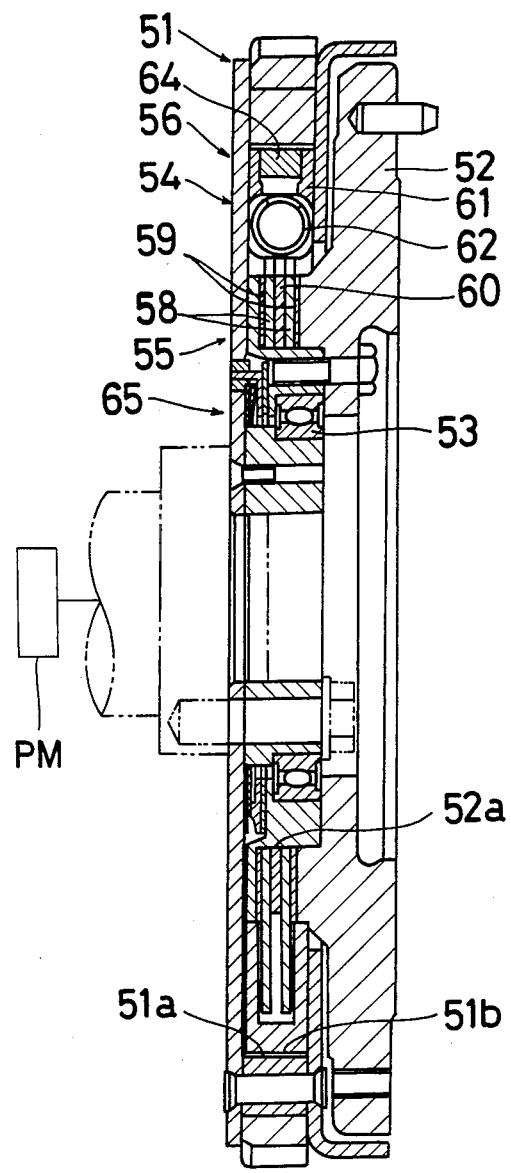
FIG. 4 is a view, similar to FIG. 1, of another embodiment of the present invention.
Figure 5:
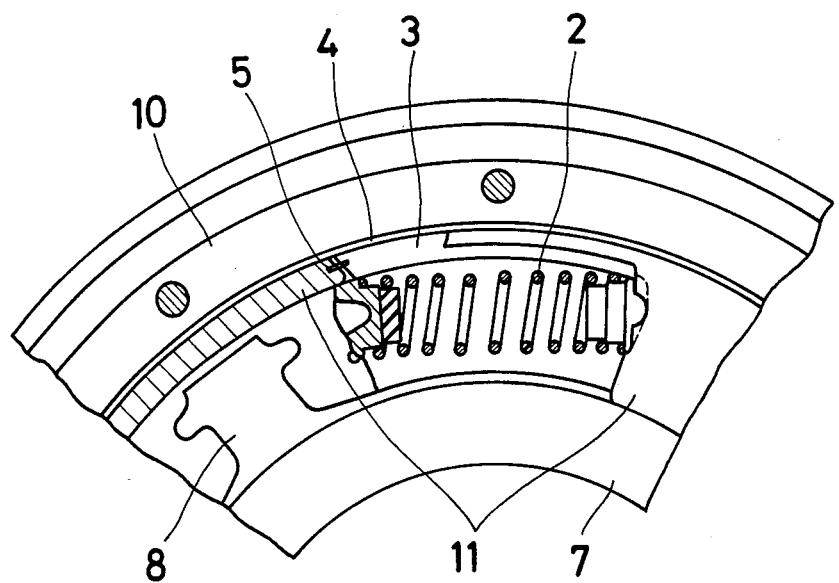
FIG. 5 is a fragmentary front elevational view, partly in section, of the device shown in FIG. 4.
Figure 6:
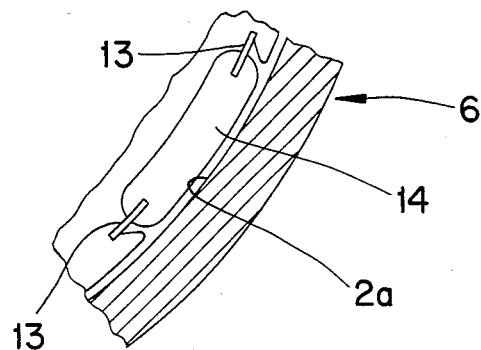
FIG. 6 is an enlarged fragmentary front elevation view of the centrifugal clutch of FIGS. 1 and 4 in which the clutch is in the engaged position.

Reference is now made to FIGS. 4 and 5 showing another embodiment of the present invention. This embodiment includes a first flywheel 51 and a second flywheel 52 which is concentric with the first flywheel 51 and which is rotatably connected thereto by a bearing 53. A spring mechanism 54, a slip mechanism 55 and a centrifugal clutch 56 are provided between the flywheels 51 and 52.

The second flywheel 52 has an annular groove 52a. The slip mechanism 55 comprises two driven disks 58, two friction members 59 and a flush spring 60 which are all fitted in the annular groove 52a. The friction members 59 slip upon receiving a predetermined amount of torque.

The first flywheel 51 also has an annular groove 51a. An intermediate ring 61 is disposed in the annular groove 51a. The intermediate ring 61 has a recess in its inner periphery. Each of the driven disks 58 has a recess in its outer periphery. The spring mechanism 54 comprises a coiled spring 62 having one end fitted in the recess of the intermediate ring 61, while the other end of the spring 62 is fitted in the recesses of the driven disks 58, so that torque may be transmitted from the first flywheel 51 to the second flywheel 52.

The intermediate ring 61 also has a plurality of circumferentially spaced apart recesses on its outer periphery. The centrifugal clutch 56 comprises a plurality of centrifugal weights 64 each held by a pair of leaf springs 63 in one of the recesses of the intermediate ring 61. Each of the centrifugal weights 64 has an outer peripheral surface facing an inner peripheral surface 51b of the first flywheel 51 in radially spaced apart relation therefrom. A hysteretic mechanism 65 is provided between the flywheels 51 and 52. The centrifugal clutch 56 functions in the same way as the clutch 6 shown in FIGS. 1 and 2.

The principles, preferred embodiment and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by other without departing from the spirit and scope of the present invention. Accordingly, it is expressly intended that all such variations and changes which fall within the scope of the present invention as defined in the appended claims be embraced thereby.

What is claimed is:

1. A device for absorbing torque fluctuations in an engine having a predetermined idling speed comprising:

a first flywheel connected to the output shaft of the engine;

a second flywheel concentric with said first flywheel and connected thereto by a bearing;

a spring mechanism provided between said first and second flywheels;

a hysteretic mechanism provided between said first and second flywheels;

a slip mechanism provided between said first and second flywheels for preventing transmission of torque from said first flywheel to said second flywheel if said torque exceeds a certain level when the engine is rotating at a speed which is lower than the idling speed;

a centrifugal clutch provided between said first and second flywheels for engaging said first flywheel with said second flywheel when the rotating speed of the engine has increased to a predetermined level;

said slip mechanism includes said first flywheel, two drive disks each having a friction member positioned in sliding contact with said first flywheel, and a cone spring disposed between said drive disks; said spring mechanism including said two drive disks, a coiled spring having one end engaging said drive disks, and an intermediate ring engaging the other end of said coiled spring; said centrifugal clutch including said intermediate ring, a plurality of weights supported on said intermediate ring, said second flywheel having a surface facing said weights, said weights being centrifugally engageable with said surface of said second flywheel; and each of said weights fastened to said intermediate ring by at least one leaf spring.

* * * * *